United States Patent [19]

Mann et al.

[11] 4,313,515
[45] Feb. 2, 1982

[54] DEVICE FOR THE CONTROL OF THE TRAVELING SPEED OF A MOTOR VEHICLE

[75] Inventors: Arnold Mann, Bieber; Bernhard Stier, Kelkheim-Fischbach, both of Fed. Rep. of Germany

[73] Assignee: VDO Adolf Schindling AG, Frankfurt am Main, Fed. Rep. of Germany

[21] Appl. No.: 107,227

[22] Filed: Dec. 26, 1979

[30] Foreign Application Priority Data

Dec. 27, 1978 [DE] Fed. Rep. of Germany ....... 2856294

[51] Int. Cl.³ .............................................. B60K 31/00
[52] U.S. Cl. ..................................... 180/179; 123/361
[58] Field of Search ....................... 180/170, 178, 179; 123/351, 352, 361

[56] References Cited

U.S. PATENT DOCUMENTS

| | | | |
|---|---|---|---|
| 3,207,255 | 9/1965 | Hahlganss et al. ................ | 180/179 |
| 3,417,836 | 12/1968 | Thorner .............................. | 180/170 |
| 3,612,017 | 10/1971 | Ishizaki et al. .................... | 180/179 X |
| 4,117,903 | 10/1978 | Fleischer et al. ................. | 180/179 |
| 4,192,399 | 3/1980 | Otteson et al. .................... | 180/170 |

*Primary Examiner*—Richard A. Bertsch
*Assistant Examiner*—Michael Mar
*Attorney, Agent, or Firm*—Martin A. Farber

[57] ABSTRACT

A device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, particularly the throttle valve, which influences the fuel-air mixture supplied to the vehicle motor. A coupling is between the element and the movable part of the regulating unit, which coupling is operatively connected directly or indirectly with the brake pedal and/or the clutch pedal of the vehicle in such a manner that during the actuation of the brake pedal or the clutch pedal the coupling is acted upon so as to separate the regulating unit from the element.

13 Claims, 5 Drawing Figures

DEVICE FOR THE CONTROL OF THE TRAVELING SPEED OF A MOTOR VEHICLE

The present invention relates to a device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, particularly the throttle valve, which influences the fuel-air mixture supplied to the vehicle motor.

The known devices of this type contain a manually actuatable switch for switching on and switching off the control device as well as a switch which is actuated by stepping down on the foot brake and serves to switch off the control device upon initiation of a braking operation.

In automobiles with a manual shift a switch is also provided which is actuated upon depression of the clutch pedal and disconnects the control device during shifting. The two switches, which can be actuated by the brake pedal and the clutch pedal, respectively, lie in the control circuit of an electromagnetic coupling which is arranged in the regulating unit between the servomotor and the movable part of the regulating unit, which movable part is coupled to the throttle valve. Upon braking and clutching, however, even upon manual disconnection of the control device, this coupling is actuated or triggered so as to disconnect the servomotor from the movable part of the regulating unit, which movable part is coupled to the throttle valve. The throttle valve is then swung back into its idling position by a spring acting on the throttle valve.

Although such devices are designed for increased reliability in operation, nevertheless cases of breakdown are conceivable in which either one of the switches fails or the coupling, despite proper actuation, does not disconnect the servo motor from the movable part of the regulating unit; in short the throttle valve is not swung as intended into its idling position but remains in a position in which the motor is operating at a higher speed of revolution than the idling speed. Such cases of breakdown can lead to faulty reactions and accordingly accidents in the case of unskilled drivers.

The object of the present invention is to provide measures by which the dependability in operation of the device is further increased.

In particular, assurance is to be provided that at least upon actuation of the brake, but also upon actuation of the automobile clutch (if present), separation is produced between the throttle valve and the control device, and the throttle valve can therefore swing unimpeded into its idling position as a result of the restoring springs.

Starting out from the device of the type described above, this objective is aided in its solution in accordance with the invention in the manner that between the element (5) (which element is generally the throttle valve, although not limited thereto), and the movable part (8) of the regulating unit (9) there is provided a coupling (22) which is operatively connected directly or indirectly with the brake pedal (19) and/or the clutch pedal (17) of the car, in such a manner that during actuation of the brake pedal or the clutch pedal the coupling (22) is acted on so as to separate the regulating unit (9) from the element (5).

By this measure it is achieved that the element which controls the fuel-air mixture is separated from the regulating unit, on the one hand, electrically via the switches associated with the brake pedal and/or the clutch pedal and the electromagnetic coupling which is controlled or triggered by them, and, on the other hand, purely mechanically via the coupling, which coupling is actuated by the brake pedal and/or the clutch pedal. By the provision of purely mechanically and of a substantially electrically operating system for the separation of the regulating unit from the element which controls the fuel-air mixture, thereby there is obtained such a substantial improvement in the reliability in operation that the possibility of a case of disturbance as described above can be excluded.

One particular advantage of the invention is that, with a suitable construction of the device, the cost of the structural portion and the cost of mounting for this measure are low and the realization of the invention can be achieved at relatively small expense.

In accordance with one advantageous embodiment of the invention, the regulating unit (9) is arranged on a spring-biased rocker (23), which rocker is operatively connected with the brake-pedal and/or the clutch pedal, and the movable part (8) of the regulating unit (9) is formed as a rigid bar which is freely connected with the element (5) or with the connecting system which are fastened thereto.

Another advantageous possible embodiment is that the regulating unit (9) is arranged on a spring-biased rocker (23) which is held in a position of rest by means of a pawl (34), which pawl can be acutated by the clutch pedal (17) and/or the brake pedal (19) and that the movable part (8) of the regulating unit is formed as a rigid bar which is freely or loosely connected with the element (5) or the connecting system (22) fastened thereto. This embodiment has the advantage over the one previously described that less force need be exterted via the clutch pedal or brake pedal in order to mechanically separate the regulating unit from the element or the connecting system fastened thereto. It is a certain disadvantage that the mechanical expense is somehow greater than with the embodiment previously described. Which of the two embodiments finally is to be selected depends on the requirements made in the specific case on the device, particularly with respect to ease of operation.

The coupling of the movable part of the regulating unit with the element is best effected in the manner that the movable part (8) of the regulating unit (9) is loosely or freely connected with the gas pedal (21) of the vehicle, which gas pedal acts on the element (5). Such a coupling of the regulating unit and element provides the advantage that it can be employed both in automotive vehicles in which a bowden cable is present between the gas pedal and the element and in automotive vehicles in which the gas pedal and the element are connected together by a rod system. Another particular advantage of this embodiment is that the regulating unit can be arranged in the inner compartment of the automotive vehicle and that thus special measures for protecting the regulating unit from corrosion and dirt can be dispensed with. This arrangement of the regulating unit within the automotive vehicle compartment furthermore permits the integration of the other parts of the control device with the regulating unit so as to form a single compact unit or module. In the known control devices, the regulating unit and the other parts of the control device are separated from each other, the regulating unit being arranged in the vicinity of the element which controls the fuel-air mixture, while the other parts of the control device, and particularly the electronic part, are located in the inner compartment of the automotive vehicle behind the instrument panel.

It has been found advantageous to form the movable part (8) of the regulating unit (9) as a rotatable shaft having an offset end (27) which is operatively connected with the element or with the connecting system fastened to the element.

This represents a particularly simple, inexpensive solution for transmitting the movement of the moving part of the regulating unit to the element or to the rod system fastened to it.

With the above and other objects and advantages in view, the present invention will become more clearly understood in connection with the detailed description of a preferred embodiment, when considered with the accompanying drawings, of which:

Figure 1:
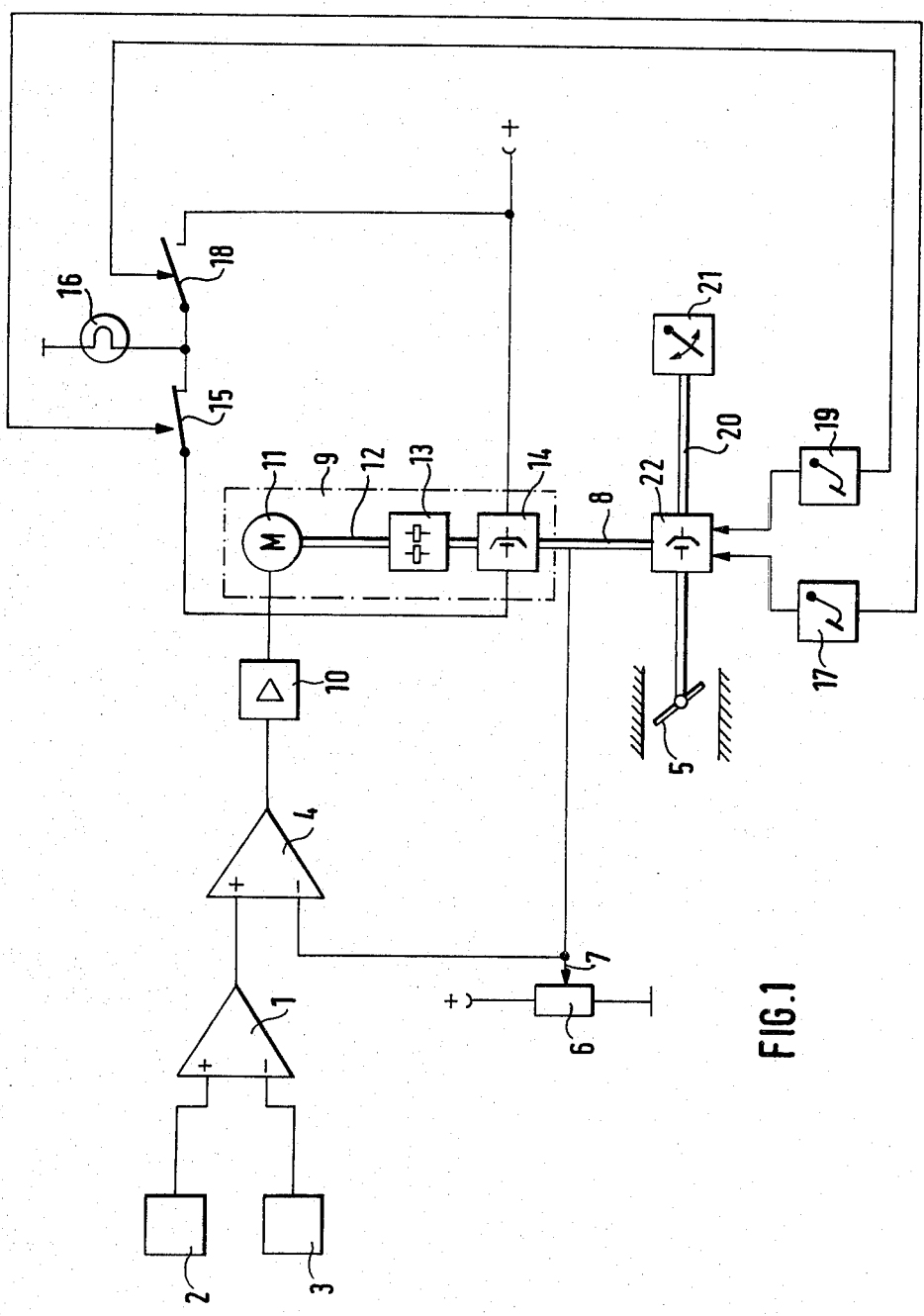
FIG. 1 is a block circuit diagram of a device for controlling the traveling speed of a motor vehicle.

The traveling speed control device contains a first comparator circuit (or differential connection), the inputs of which are connected with a transmitter or indicator 2 for the actual value of the speed and with a transmitter or indicator 3 for the intended, desired value of the speed and which forms a difference from the desired value and the actual value signals. In an additional comparator circuit 4 this difference value as the desired value of the throttle valve position is compared with the actual position of the throttle valve 5, which actual position is represented over the resistor 6 as a voltage signal. For this purpose the wiper 7 of the variable resistor 6 is coupled with the movable part 8 of the regulating unit 9. The servomotor 11 of the regulating unit 9 is controlled via an amplifier 10 by the output signal of the comparator circuit 4, which output signal is proportional to the deviation of the desired value of the throttle valve position from the actual value of the same. The shaft 12 of the servomotor 11 is in operative connection, via a transmission or mechanical gearing 13 and an electromagnetic coupling 14, with the movable part 8 of the regulating unit 9.

The excitation winding of the electromagnetic coupling 14 on the one side is connected to positive potential and on the other side is grounded via a switch 15 and the brake light 16. The switch 15 is formed as a normally closed contact and is in operative connection with the clutch pedal 17 of the motor vehicle. The brake light 16 is connected directly to positive potential via the brake light switch 18, which brake light switch is formed as an operating or normally opened contact. Upon stepping down on the clutch pedal 17 the switch 15 opens, whereby the excitation winding of the electromagnetic coupling 14 becomes currentless and the coupling of the transmission 13 separates from the movable part 8 of the regulating unit 9.

Likewise a separating operation of the electromagnetic coupling 14 takes place when the foot brake pedal 19 is pressed down and automatically along with this the switch 18 is closed.

The throttle valve 5 is connected via a connecting system 20 with the gas (accelerator) pedal 21 of the motor vehicle. The movable part 8 of the regulating unit 9 acts on this connecting system 20 via a coupling 22. The mechanical coupling 22 can be actuated by stepping down on the clutch 17 and/or stepping down on the brake pedal 19 in the sense of separating the connection between the movable part 8 of the regulating unit 9 and the throttle valve 5. The connection of the gas pedal 21 with the throttle valve 5 remains unaffected with an actuation of the coupling in this respect.

Figure 2:
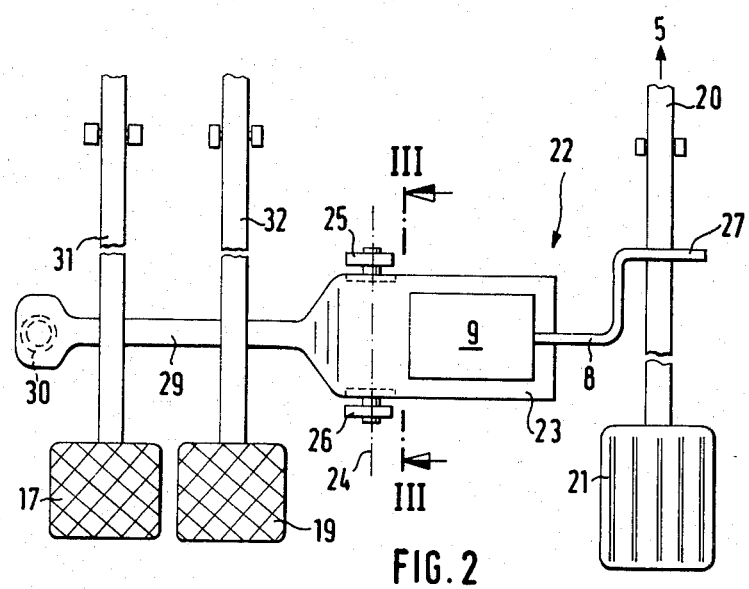
FIG. 2 is a top plan view of the regulating unit of the device according to FIG. 1, the regulating unit being fastened to a rocker.
Figure 3:
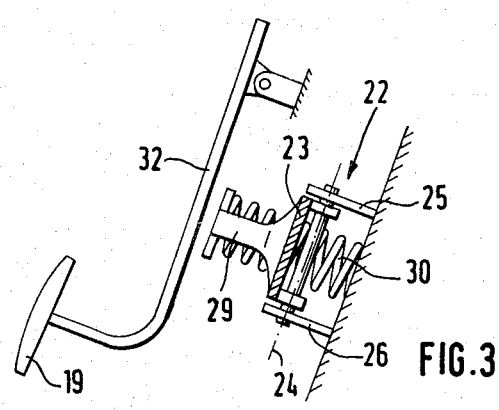
FIG. 3 is a partially sectioned side view of the rocker with the regulating unit according to FIG. 2 taken along the lines III—III of FIG. 2.

As can be noted from FIGS. 2 and 3, the coupling 22 comprises a rocker 23 which is supported for rotation around the axis 24. The bearing lugs 25 and 26 are fastened to a part of the body of the automobile. On one part of the rocker 23 there is seated the regulating unit 9 (the control member portion of the control device), the movable part 8 of the regulating unit being provided with an offset end 27 which lies freely on the gas pedal 21. The other part of the rocker 23 is developed as an arm 29, the free end of which is acted on by a compression spring 30. Another portion of the spring 30 is supported on a part of the body of the motor vehicle.

Upon depression of the clutch pedal 17 or the brake pedal 19, they come into contact, via their rods 31 or 32, respectively, with the arm 29, which as a result thereof is also depressed or pressed down against the force of the compression spring 30.

In this manner the part of the rocker 23 which carries the regulating unit 9 is lifted and the offset end 27 of the movable part 8 of the regulating unit 9 goes out of engagement from the gas pedal 21. As a result, the control device is mechanically separated from the gas pedal 21 and thus also from the throttle valve 5. Upon depression of the clutch pedal 17 or the brake pedal 19, and assuming that the entire control device is in proper working condition, the switch 15 or 18, respectively, is also simultaneously actuated, whereby the coupling 14 is also triggered or acted upon in such a manner as to separate the movable part 8 of the regulating unit 9 from the servomotor 11. This separation of the movable part 8 of the regulating unit 9 from the throttle valve 5 takes place electrically. The triggering or control of the electromagnetic coupling 14 via the switch 15 or the switch 18, respectively, furthermore has the result that the servomotor 11 is turned back into its initial position. As soon as the clutch pedal 17 or the brake pedal 19 is again released, the rocker 23 is swung back into its starting position by means of the compression spring 30, the offset end 27 again coming into the range of or even into abutment against the gas pedal 21. As soon as the control device is again switched into active or operative condition by a manual switch (not shown), the movable part 8 of the regulating unit 9 turns so that the offset end 27 comes against the gas pedal 21 and swings the latter corresponding to the intended, desired speed.

Figure 4:
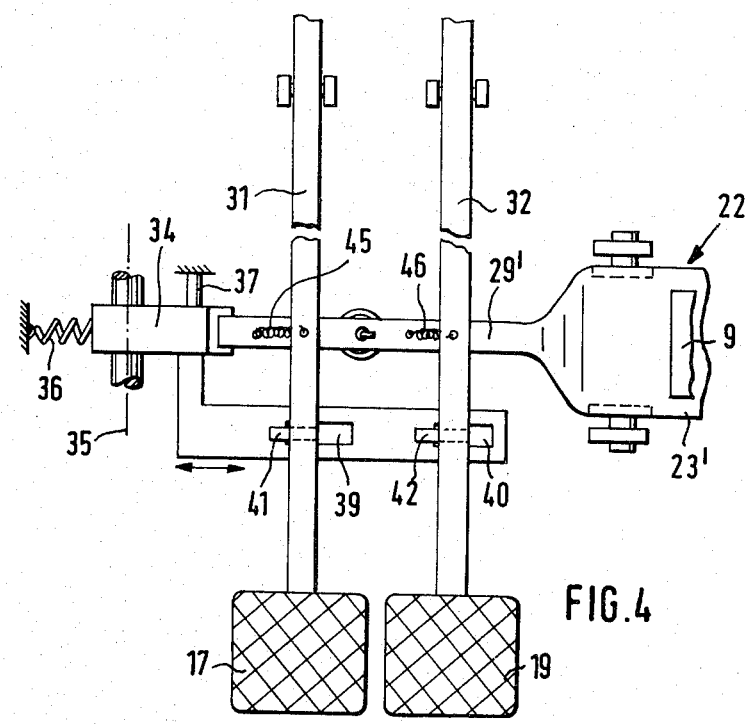
FIG. 4 is a plan view of another embodiment of the rocker with the regulating unit.
Figure 5:
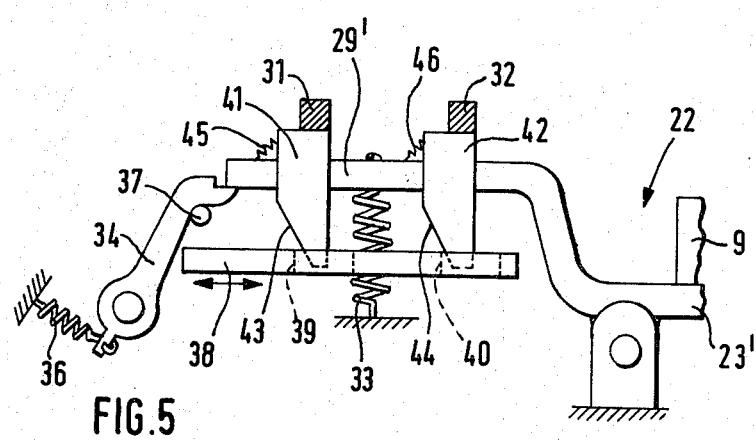
FIG. 5 is a side view of the rocker with the regulating unit according to FIG. 4.

In the embodiment shown in FIGS. 4 and 5, the coupling 22 again comprises a pivotal rocker 23' which again carries the regulating unit 9 on one part thereof and which passes at its other part into an arm 29'. A tension spring 33 acts on this arm. The other end of the spring is fixed in position.

The arm 29' rest on a pawl 34 which is mounted for rotation around an axle 35. The pawl 34 is held in its position of rest by a tension spring 36, in which position the pawl lies against an abutment 37. The pawl 34 can be swung out of this position of rest by means of a longitudinally displaceable control element 38. The control element 38 contains two slots 39 and 40 into which there extend release members 41 and 42, respectively, formed with inclined planes 43 and 44, respectively. The release member 41 is fastened to the connecting rod 31 of the clutch pedal 17 and the release member 42 is fastened to the connecting rod 32 of the brake pedal 19. If one of the two pedals 17 or 19 is now depressed, the control element 38 is moved towards the left into the pawl by the action of the inclined plane 43 of the release member 41 or by the inclined plane 44 of the release member 42, and the pawl 34 is swung out of its position of rest. The result is that the arm 29' is pulled downwardly by the tension spring 33 and the movable element 8 (not shown in FIGS. 4 and 5 but formed as shown in FIGS. 2 and 3) of the regulating unit 9 is thus lifted and thereby brought out of engagement with the gas pedal 21. If the depressed pedal 17 or 19 is then released, then by means of the spring 45 or 46, respectively, the arm 29' is pulled back into its original position, in which position the pawl 34 (which pawl is rotated back by means of the spring 36 against the abutment 37 and returns the released control element 38) supports the free end of the arm 29'.

While there have been disclosed several embodiments of the invention, these embodiments are given by example only and not in a limiting sense.

We claim:

1. In a device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, which influences the fuel-air mixture supplied to the vehicle motor, the improvement wherein said regulating unit has a movable part,
coupling means for operatively coupling said movable part with the element,
said coupling means for being operatively connected with a brake pedal and/or a clutch pedal of the vehicle in such a manner that during actuation of the brake pedal and/or the clutch pedal said coupling means is acted on so as to separate the regulating unit from the element,
a spring-biased rocker is operatively connected with the brake pedal and/or the clutch pedal,
said regulating unit is mounted on said rocker,
said movable part of the regulating unit is formed as a rigid bar,
said rigid bar is freely connected with the element.

2. In a device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, which influences the fuel-air mixture supplied to the vehicle motor, the improvement wherein said regulating unit has a movable part,
coupling means for operatively coupling said movable part with the element,
said coupling means for being operatively connected with a brake pedal and/or a clutch pedal of the vehicle in such a manner that during actuation of the brake pedal and/or the clutch pedal said coupling means is acted on so as to separate the regulating unit from the element,
a spring-biased rocker is operatively connected with the brake pedal and/or the clutch pedal,
said regulating unit is mounted on said rocker,
said movable part of the regulating unit is formed as a rigid bar,
a connecting system fastened to the element,
said rigid bar is freely connected to said connecting system.

3. In a device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, which influences the fuel-air mixture supplied to the vehicle motor, the improvement wherein said regulating unit has a movable part,
coupling means for operatively coupling said movable part with the element,
said coupling means for being operatively connected with a brake pedal and/or a clutch pedal of the vehicle in such a manner that during actuation of the brake pedal and/or the clutch pedal said coupling means is acted on so as to separate the regulating unit from the element,
a spring-biased rocker,
said regulating unit is mounted on said rocker,
pawl means for holding said rocker in a position of rest,
said pawl means is operatively connectable to and actuatable by the clutch pedal and/or the brake pedal, and
the movable part of the regulating unit is formed as a rigid bar,
said rigid bar is freely connected with the element.

4. In a device for the control of the traveling speed of a motor vehicle with an electrical controller which compares the prevailing actual speed with a desired nominal speed and contains a regulating unit electromotorically controlled by the control deviation, which regulating unit is coupled directly or indirectly with an element, which influences the fuel-air mixture supplied to the vehicle motor, the improvement wherein said regulating unit has a movable part,
coupling means for operatively coupling said movable part with the element,
said coupling means for being operatively connected with a brake pedal and/or a clutch pedal of the vehicle in such a manner that during actuation of the brake pedal and/or the clutch pedal said coupling means is acted on so as to separate the regulating unit from the element,
a spring-biased rocker,
said regulating unit is mounted on said rocker,
pawl means for holding said rocker in a position of rest,
said pawl means is operatively connectable to and actuatable by the clutch pedal and/or brake pedal, and the movable part of the regulating unit is formed as a rigid bar, a connecting system is fastened to the element, said rigid bar is freely connected to said connecting system.

5. The device according to claims 1, 2, 3 or 4, wherein said means for coupling the movable part of the regulating unit with the element constitutes a free connection of said movable part of the regulating unit with a gas pedal of the vehicle, the gas pedal acting on the element.

6. The device according to claim 1, or 3, wherein said movable part of the regulating unit is formed as a rotatable shaft having an offset end which is operatively connected with the element.

7. The device according to claim 2 or 4, wherein said movable part of the regulating unit is formed as a rotatable shaft having an offset end which is operatively connected with the connecting system fastened to the element.

8. The device according to claim 5, wherein said movable part of the regulating unit is formed as a rotatable shaft having an offset end which is operatively connected with the gas pedal.

9. The device according to claim 1, 2, 3 or 4, wherein said element is a throttle valve.

10. The device according to claim 1, 2, 3 or 4, further comprising means for directly connecting said coupling means with the brake pedal and/or the clutch pedal.

11. The device according to claim 1, 2, 3 or 4, further comprising means for indirectly connecting said coupling means with the brake pedal and/or the clutch pedal.

12. The device according to claim 1, 2, 3 or 4, further comprising means for simultaneously substantially electrically operatively decoupling the regulating unit from the element during the actuation of the brake pedal or the clutch pedal.

13. The device according to claim 1, 2, 3 or 4, wherein said coupling means is a mechanical coupling.

* * * * *